United States Patent [19]

Kobayashi et al.

[11] Patent Number: 5,788,924
[45] Date of Patent: Aug. 4, 1998

[54] WEAR RESISTANT COPPER ALLOY AND SYNCHRONIZER RING MADE THEREOF

[75] Inventors: Masao Kobayashi; Yoshiharu Mae. both of Omiya, Japan

[73] Assignee: Mitsubishi Materials Corporation, Tokyo, Japan

[21] Appl. No.: 548,071

[22] Filed: Oct. 25, 1995

[30] Foreign Application Priority Data

Oct. 27, 1994 [JP] Japan .................. 6-340659

[51] Int. Cl.$^6$ .................. C22C 9/04; F16D 23/06
[52] U.S. Cl. .................. 420/479; 420/450; 148/434
[58] Field of Search .................. 420/478, 479, 420/480; 148/434

[56] References Cited

U.S. PATENT DOCUMENTS 4,874,439 10/1989 Akutsu .................. 420/478
5,137,685 8/1992 McDevitt et al. .................. 420/477

Primary Examiner—Sikyin Ip
Attorney, Agent, or Firm—Armstrong, Westerman, Hattori, McLeland & Naughton

[57] ABSTRACT

A wear resistant copper alloy composition which includes:

| Component | (% by weight) |
|---|---|
| Zn | 20 to 40 |
| Al | 2 to 11 |
| at least one iron family metal selected from Fe, Ni, and Co | 1 to 5 |
| Ti | 0.1 to 4 |
| Component X, which is at least one of Mn or S, in the amounts indicated | Mn = 0.01 to less than 0.1  S = 0.0005 to 0.01 |
| Cu (with unavoidable impurities) | balance. |

The copper alloy, which contains as an optional component Mg (from 0.01 to 0.5% by weight), is particularly suitable for manufacturing synchronizer rings in automatic transmissions for internal combustion engines.

14 Claims, 1 Drawing Sheet

WEAR RESISTANT COPPER ALLOY AND SYNCHRONIZER RING MADE THEREOF

BACKGROUND OF THE INVENTION

Synchronizer rings for automatic transmissions for internal combustion engines are required to withstand severe conditions and have wear resistance. Copper alloys have been used for such synchronizer rings. For example, Japanese Laid-Open Patent Application No. 64-55347 discloses the following composition:

| Component | (% by weight) |
|---|---|
| Zn | 17 to 40 |
| Al | 2 to 11 |
| at least one of Fe, Ni, Co | 0.02 to 3 |
| at least one of Ti, Zr, V | 0.1 to 3.5 |
| at least one of P, Mg, Ca | 0.003 to 0.3 |
| Mn | 0.1 to 4 |
| Cu (with unavoidable impurities) | balance. |

With the advent of more powerful internal combustion engines recently, synchronizer rings made of known copper alloys do not possess sufficient wear resistance to withstand the higher load and higher rotation speed in these engines. Therefore, the lifetimes of known synchronizer rings when used in those engines were not adequate.

SUMMARY OF THE INVENTION

The object of the invention is to develop a copper alloy having improved wear resistance, which is suitable for synchronizer rings. The copper alloy of the invention has the following composition:

| Component | (% by weight) |
|---|---|
| Zn | 20 to 40 |
| Al | 2 to 11 |
| at least one of Fe, Ni, Co | 1 to 5 |
| Ti | 0.1 to 4 |
| Component X, which is at least one of Mn, S, in the amounts indicated | Mn = 0.01 to less than 0.1<br>S = 0.0005 to 0.01 |
| Cu (with unavoidable impurities) | balance. |

Another object of the invention is to develop a copper alloy composition having improved wear resistance and characterized by improved hardness, particularly at high temperatures. The copper alloy having those characteristics has the same composition as shown immediately above, but also contains Mg in the following amounts (% by weight):

| Additional component | (% by weight) |
|---|---|
| Mg | 0.01 to 0.5 |

DETAILED DESCRIPTION OF THE INVENTION

Figure 1:
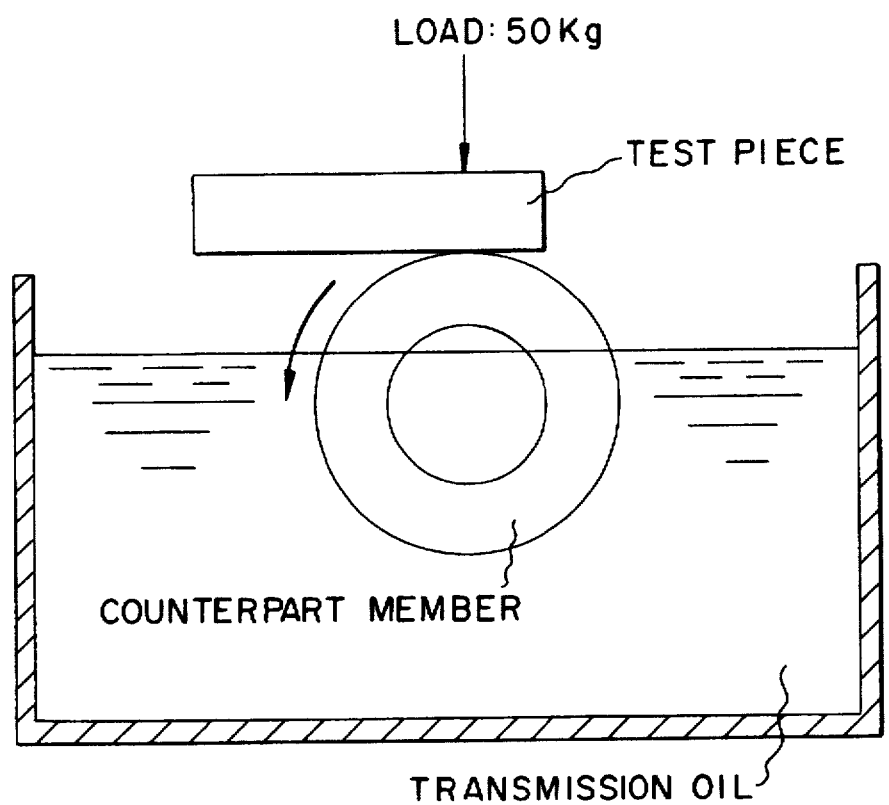
FIG. 1 is a drawing illustrating a wear resistance test method.

In conducting research to obtain a copper alloy having increased wear resistance suitable for synchronizer rings, the inventors have determined that the use of an Mn content which is smaller than in known copper alloy compositions for synchronizer rings helps to increase the wear resistance. Thus, the copper alloy of the invention has the following composition:

| Component | (% by weight) |
|---|---|
| Zn | 20 to 40 |
| Al | 2 to 11 |
| at least one of Fe, Ni, Co | 1 to 5 |
| Ti | 0.1 to 4 |
| Component X, which is at least one of Mn, S, in the amounts indicated | Mn = 0.01 to less than 0.1<br>S = 0.0005 to 0.01 |
| Cu (with unavoidable impurities) | balance. |

Synchronizer rings made of the copper alloy of the invention have excellent wear resistance exceeding the resistance of known synchronizer rings, and have longer lifetimes.

In another aspect of the invention, the copper alloy contains in addition to the above-recited components in the above recited ranges the following additional component:

| Additional component | (% by weight) |
|---|---|
| Mg | 0.01 to 0.5 |

The copper alloy of the invention which contains Mg in the above-recited amount has significantly improved hardness, in particular hardness at high temperatures.

The composition of the copper alloy of the invention is further described below in terms of its components. All proportions recited hereinafter are in percent by weight.

(1) Zn and Al

Zn and Al, when present in combination, have the effect of improving the strength and toughness of the alloy. Strength and toughness cannot be achieved when the Zn content becomes less than 20% or the Al content becomes less than 2%. On the other hand, when the Zn content exceeds 40% or the Al content exceeds 11%, there is an undesirable decrease in toughness. Accordingly, the Zn content should be from 20 to 40%, and the Al content should be from 2 to 40%. The preferable ranges are:

| Component | (% by weight) |
|---|---|
| Zn | 25-40 |
| Al | 2-7 |

(2) Fe, Ni, Co in combination with Ti

Ti forms intermetallic compounds with the iron family metals, namely Fe, Ni and Co. Therefore, when Ti is present with at least one element selected from the group consisting of Fe, Ni and Co, the wear resistance is enhanced to due to dispersion of the intermetallic compounds into the matrix. When the iron family metal content is less than 1%, or Ti is less than 0.1%, the desired effects cannot be achieved. On the other hand, when the iron family metal content exceeds 5% or the Ti content exceeds 4%, there is an undesirable reduction in toughness. Accordingly, the iron family content should be from 1 to 5%, and the Ti content should be 0.1 to 4%. The preferable ranges are:

| Component | (% by weight) |
| --- | --- |
| Iron family metals | 2–4 |
| Ti | 0.5–3 |

(3) Mn

The use of Mn in smaller amounts than in known copper alloy compositions improves the wear resistance of the copper alloy of the invention. The Mn content should be from 0.01 to less than 0.1%, the preferred range being 0.03 to 0.07%. The wear resistance is not satisfactory when the Mn content is less than 0.01%. On the other hand, an Mn content of more than 0.1% reduces the wear resistance and further impairs workability.

(4) S

S has the effect of improving wear resistance in the copper alloy of the invention. The S content should be from 0.0005 to 0.01%. An S content of less than 0.0005% is not sufficient to improve the wear resistance. On the other hand, an S content of more than 0.01% undesirably hinders hot workability. A preferred range for S is 0.001 to 0.005%.

(5) Mg

Mg improves the hardness of the copper alloy of the invention, in particular hardness at high temperatures. Therefore, it is desirable to include Mg in the copper alloy of the invention for manufacturing synchronizer rings to be used under operating conditions of high load and/or high speed revolution. The Mg content should be from 0.01 to 0.5%, more preferably from 0.05 to 0.35%. An Mg content of less than 0.01% does not achieve the desired effect, and an Mg content of more than 0.5% causes undesirable lowering of the toughness.

The invention is further illustrated in the following examples, to which the invention is not limited.

EXAMPLES

Copper alloys having the compositions shown in Tables 1–3 were prepared in a high-frequency melting furnace, and then ingots of 65 mm in diameter and 220 mm in length were made by die casting. These ingots were hot forged at 750° C. to prepare synchronizer rings blanks of 15 mm in thickness, 100 mm in width, and 300 mm in length. The thus made synchronizer ring blanks were cut to prepare test pieces 1–30 for the synchronizer ring of the invention (hereinafter designated as "test pieces of the invention") and to prepare test pieces 1–3 of known synchronizer rings (hereinafter designated as "conventional test pieces") . Further, a circular carburizing and quenching steel counter member (surface roughness: 2.0 to 2.5 Rz) was used as a counterpart member. A surface roughness of 2.0 to 2.5 Rz means that the average surface roughness of the ten points of the curved area, as defined in JIS B 0601- 1982, is 2.0 to 2.5 µ.

The test piece 1 and the counterpart member 2 were positioned as shown in FIG. 1, the counterpart member 2 being immersed in oil 3. Thereafter, the counterpart member 2 was subject to rotation under the following conditions as the test piece 1 was pressed with the load 4 of 50 kg as shown in FIG. 1:

sliding velocity: 5 m/s oil: transmission oil sliding distance: 10 km oil temperature: 80° C.

The wear depth of the test pieces was measured to evaluate the wear resistance. The results are shown in Table 1 through Table 3.

TABLE 1

| TEST PIECE | COMPOSITION (Weight %): Cu contains unavoidable impurities | | | | | | | | | | WEAR DEPTH |
| --- | --- | --- | --- | --- | --- | --- | --- | --- | --- | --- | --- |
| | Zn | Al | Ni | Fe | Co | Ti | Mn | S | Mg | Cu | (µm) |
| S I  1 | 20.5 | 4.6 | 2.6 | — | — | 1.6 | 0.05 | — | — | BAL. | 75 |
| 2 | 31.5 | 4.6 | 2.5 | — | — | 1.5 | 0.06 | — | — | BAL. | 70 |
| 3 | 38.5 | 4.6 | 2.4 | — | — | 1.6 | 0.06 | — | — | BAL. | 72 |
| 4 | 31.2 | 2.1 | 2.4 | — | — | 1.6 | 0.05 | — | — | BAL. | 74 |
| 5 | 30.5 | 10.5 | 2.4 | — | — | 1.4 | 0.06 | — | — | BAL. | 72 |
| 6 | 31.1 | 4.7 | 1.1 | — | — | 1.5 | 0.06 | — | — | BAL. | 86 |
| 7 | 31.2 | 4.7 | 4.8 | — | — | 1.5 | 0.07 | — | — | BAL. | 65 |
| 8 | 31.7 | 4.5 | — | 2.5 | — | 1.6 | 0.05 | — | — | BAL. | 71 |
| 9 | 30.8 | 4.6 | — | — | 2.6 | 1.7 | 0.05 | — | — | BAL. | 70 |
| 10 | 30.9 | 4.6 | 1.2 | 1.3 | — | 1.6 | 0.06 | — | — | BAL. | 72 |
| 11 | 31.0 | 4.7 | 1.3 | — | 1.3 | 1.7 | 0.06 | — | — | BAL. | 70 |

S I: THE INVENTION'S TEST PIECES
S II: CONVENTIONAL TEST PIECES

TABLE 2

| TEST PIECE | COMPOSITION (Weight %): Cu contains unavoidable impurities | | | | | | | | | | WEAR DEPTH |
| --- | --- | --- | --- | --- | --- | --- | --- | --- | --- | --- | --- |
| | Zn | Al | Ni | Fe | Co | Ti | Mn | S | Mg | Cu | (µm) |
| S I  12 | 31.3 | 4.7 | — | 1.2 | 1.6 | 1.6 | 0.06 | — | — | BAL. | 68 |
| 13 | 30.7 | 4.8 | 1.0 | 0.8 | 1.4 | 1.4 | 0.06 | — | — | BAL. | 71 |

TABLE 2-continued

| TEST PIECE | COMPOSITION (Weight %): Cu contains unavoidable impurities | | | | | | | | | | WEAR DEPTH (μm) |
|---|---|---|---|---|---|---|---|---|---|---|---|
| | Zn | Al | Ni | Fe | Co | Ti | Mn | S | Mg | Cu | |
| 14 | 31.2 | 4.6 | 2.5 | — | 0.12 | 0.12 | 0.06 | — | — | BAL. | 83 |
| 15 | 31.5 | 4.6 | 2.4 | — | 3.8 | 3.8 | 0.05 | — | — | BAL. | 78 |
| 16 | 31.5 | 4.5 | 2.4 | — | 1.6 | 1.6 | 0.02 | — | — | BAL. | 88 |
| 17 | 31.2 | 4.8 | 2.5 | — | 1.6 | 1.6 | 0.09 | — | — | BAL | 65 |
| 18 | 31.2 | 4.6 | 2.4 | — | 1.6 | 1.6 | — | 0.0007 | — | BAL. | 77 |
| 19 | 31.5 | 4.6 | 2.5 | — | 1.7 | 1.7 | — | 0.001 | — | BAL. | 75 |
| 20 | 31.3 | 4.8 | 2.4 | — | 1.7 | 1.7 | — | 0.002 | — | BAL. | 72 |
| 21 | 30.7 | 4.6 | 2.5 | — | 1.6 | 1.6 | — | 0.003 | — | BAL. | 71 |
| 22 | 30.8 | 4.7 | 2.4 | — | 1.6 | 1.6 | — | 0.005 | — | BAL. | 68 |

S I: THE INVENTION'S TEST PIECES
S II: CONVENTIONAL TEST PIECES

TABLE 3

| TEST PIECE | | COMPOSITION (Weight %): Cu contains unavoidable impurities | | | | | | | | | WEAR DEPTH (μm) |
|---|---|---|---|---|---|---|---|---|---|---|---|
| | | Zn | Al | Ni | Fe | Co | Ti | Mn | S | Mg | Cu | |
| S I | 23 | 30.9 | 4.6 | 2.4 | — | — | 1.7 | — | 0.009 | — | BAL. | 65 |
| | 24 | 30.6 | 4.6 | 2.6 | — | — | 1.6 | 0.07 | 0.001 | — | BAL. | 55 |
| | 25 | 31.2 | 4.7 | 2.4 | — | — | 1.6 | 0.05 | 0.002 | — | BAL. | 50 |
| | 26 | 31.2 | 4.6 | 2.5 | — | — | 1.6 | 0.08 | — | 0.02 | BAL. | 60 |
| | 27 | 30.5 | 4.7 | 2.4 | — | — | 1.7 | 0.08 | — | 0.48 | BAL. | 55 |
| | 28 | 30.6 | 4.6 | 2.5 | — | — | 1.6 | — | 0.001 | 0.21 | BAL. | 70 |
| | 29 | 31.2 | 4.6 | 2.5 | — | — | 1.6 | — | 0.002 | 0.15 | BAL. | 68 |
| | 30 | 31.3 | 4.6 | 2.4 | — | — | 1.7 | 0.08 | 0.001 | 0.18 | BAL. | 47 |
| S II | 1 | 31.5 | 4.6 | 2.5 | — | — | 1.6 | — | — | 0.15 | BAL. | 125 |
| | 2 | 31.1 | 4.7 | 2.4 | — | — | 1.7 | 0.15 | — | 0.16 | BAL. | 95 |
| | 3 | 31.2 | 4.6 | 2.5 | — | — | 1.6 | 3.8 | — | 0.15 | BAL. | 230 |

S I: THE INVENTION'S TEST PIECES
S II: CONVENTIONAL TEST PIECES

The results in Table 1 through Table 3 show that the test pieces 1–30 of the invention are much more superior in wear resistance (i.e., exhibit less wear) than the conventional test pieces 1–3.

In addition to their use in synchronizer rings, the copper alloys of the invention can be used in other applications requiring high wear resistance under severe conditions.

We claim:

1. A wear resistant copper alloy composition consisting essentially of:

| Component | (% by weight) |
|---|---|
| Zn | 20 to 40 |
| Al | 2 to 11 |
| at least one iron family metal selected from the group consisting of Fe, Ni, and Co | 1 to 5 |
| Ti | 0.1 to 4 |
| Mn | 0.02 to 0.08 |
| optionally S | 0.0005 to 0.01 |
| Cu (with unavoidable impurities) | balance. |

2. A copper alloy composition according to claim 1, further consisting essentially of:

| Additional component | (% by weight) |
|---|---|
| Mg | 0.01 to 0.5 |

3. A copper alloy composition according to claim 2, wherein the amount of Mg is from 0.05 to 0.35% by weight.

4. A copper alloy composition according to claim 1, wherein the amount of Zn is from 25 to 40% by weight, and the amount of Al is from 2 to 7% by weight.

5. A copper alloy composition according to claim 1, wherein the amount of the component which is at least one iron family metal is from 2 to 4 % by weight, and the amount of Ti is from 0.5 to 3% by weight.

6. A copper alloy composition according to claim 1, wherein the amount of Mn is from 0.05 to 0.07% by weight.

7. A copper alloy composition according to claim 1, wherein the amount of S is from 0.001 to 0.005% by weight.

8. A synchronizer ring for an automatic transmission system, said synchronizer ring being made from a copper alloy consisting essentially of the composition:

| Component | (% by weight) |
|---|---|
| Zn | 20 to 40 |
| Al | 2 to 11 |

-continued

| Component | (% by weight) |
| --- | --- |
| at least one iron family metal selected from the group consisting of Fe, Ni, and Co | 1 to 5 |
| Ti | 0.1 to 4 |
| Mn | 0.02 to 0.08 |
| optionally S | 0.0005 to 0.01 |
| Cu (with unavoidable impurities) | balance. |

9. A synchronizer ring according to claim 8, wherein the copper alloy composition further consisting essentially of:

| Additional component | (% by weight) |
| --- | --- |
| Mg | 0.01 to 0.5 |

10. A synchronizer ring according to claim 9, wherein the amount of Mg in the copper alloy composition is from 0.05 to 0.35% by weight.

11. A synchronizer ring according to claim 8, wherein the amount of Zn in the copper alloy composition is from 25 to 40% by weight, and the amount of Al is from 2 to 7% by weight.

12. A synchronizer ring according to claim 8, wherein the amount of the component which is at least one iron family metal in the copper alloy composition is from 2 to 4% by weight, and the amount of Ti is from 0.5 to 3% by weight.

13. A synchronizer ring according to claim 8, wherein the amount of Mn in the copper alloy composition is from 0.05 to 0.07% by weight.

14. A synchronizer ring according to claim 8, wherein the amount of S in the copper alloy composition is from 0.001 to 0.005% by weight.

* * * * *